United States Patent

[11] 3,593,649

[72] Inventors Andrea Ivo Novi
 63, Corso Buenos Aires;
 Mario Egi, 2, Via Carignano, both of Milan, Italy
[21] Appl. No. 779,570
[22] Filed Nov. 27, 1968
[45] Patented July 20, 1971
[32] Priority Nov. 30, 1967
[33] Italy
[31] 23340-A/67

[54] COFFEE-MAKING APPARATUS
 8 Claims, 3 Drawing Figs.

[52] U.S. Cl. ................................................. 99/289, 99/280
[51] Int. Cl. ................................................. A47j 31/00
[50] Field of Search ........................................ 99/289, 283, 280, 281, 282, 299, 300, 302

[56] References Cited
UNITED STATES PATENTS
2,943,556 7/1960 Egi ............................. 99/283 X

*Primary Examiner*—Robert W. Jenkins
*Attorney*—Michael S. Striker

ABSTRACT: An automatic coffeemaking apparatus comprising a drum supported for rotation about an horizontal axis within a cylindrical chamber formed in a casing and having an upwardly turned fresh coffee inlet passage, a laterally turned screened beverage outlet passage and a downwardly turned exploited coffee exhaust and dispensing passage diametrally opposite to said inlet passage, the said passage defining a first and respectively a second and a third work station circumferentially spaced of 90° from each other. The said drum is formed with two diametrally located opposite coffeemaking cavities and adapted to be intermittently driven for successive 90° rotational steps, whereby either of said cavities is sequentially indexed at any of said stations, and the indexing of any cavity at said third station for exploited coffee exhaustion causing indexing of the other cavity at the first station, preparatory for a next cycle of operation.

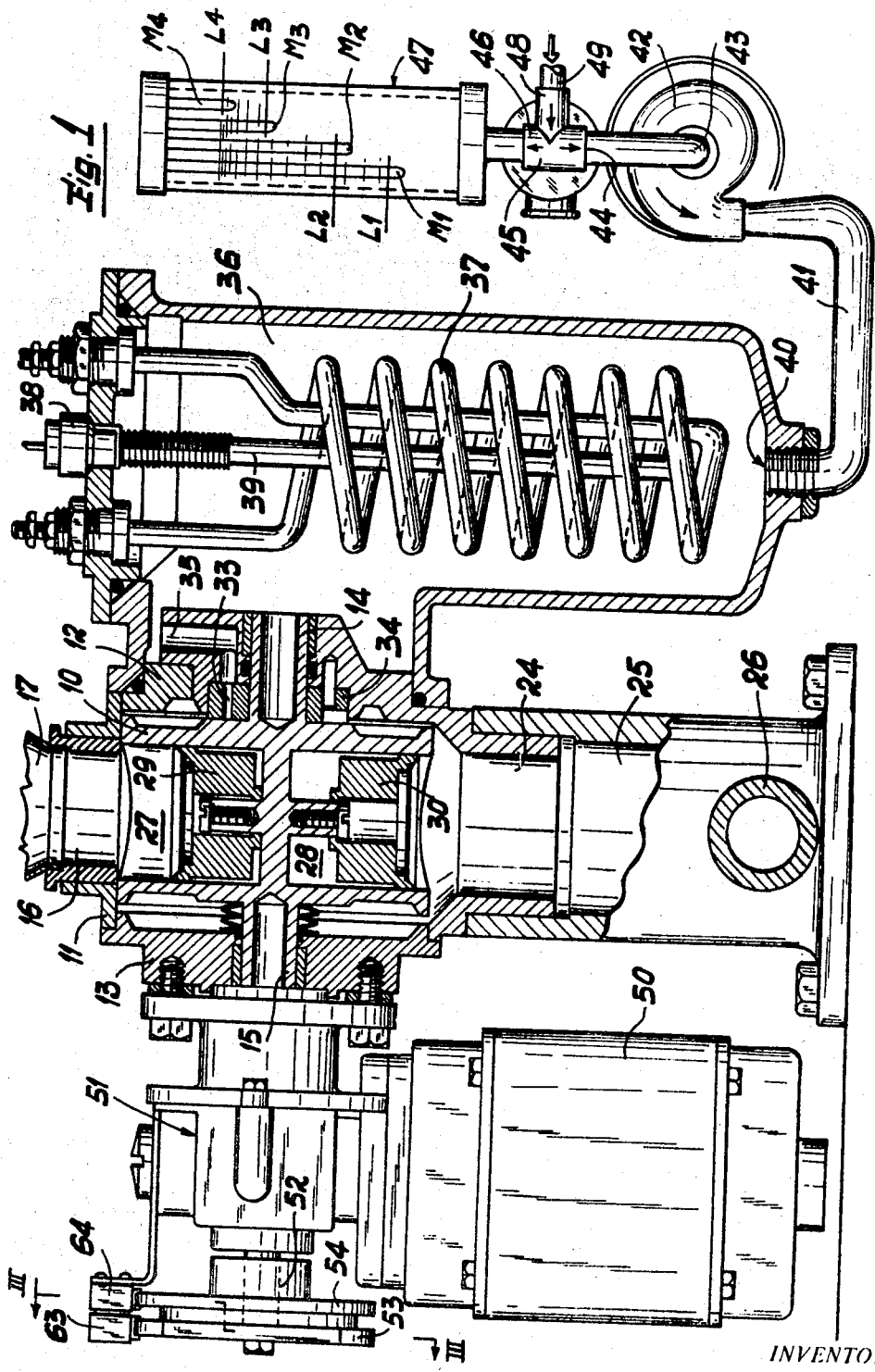

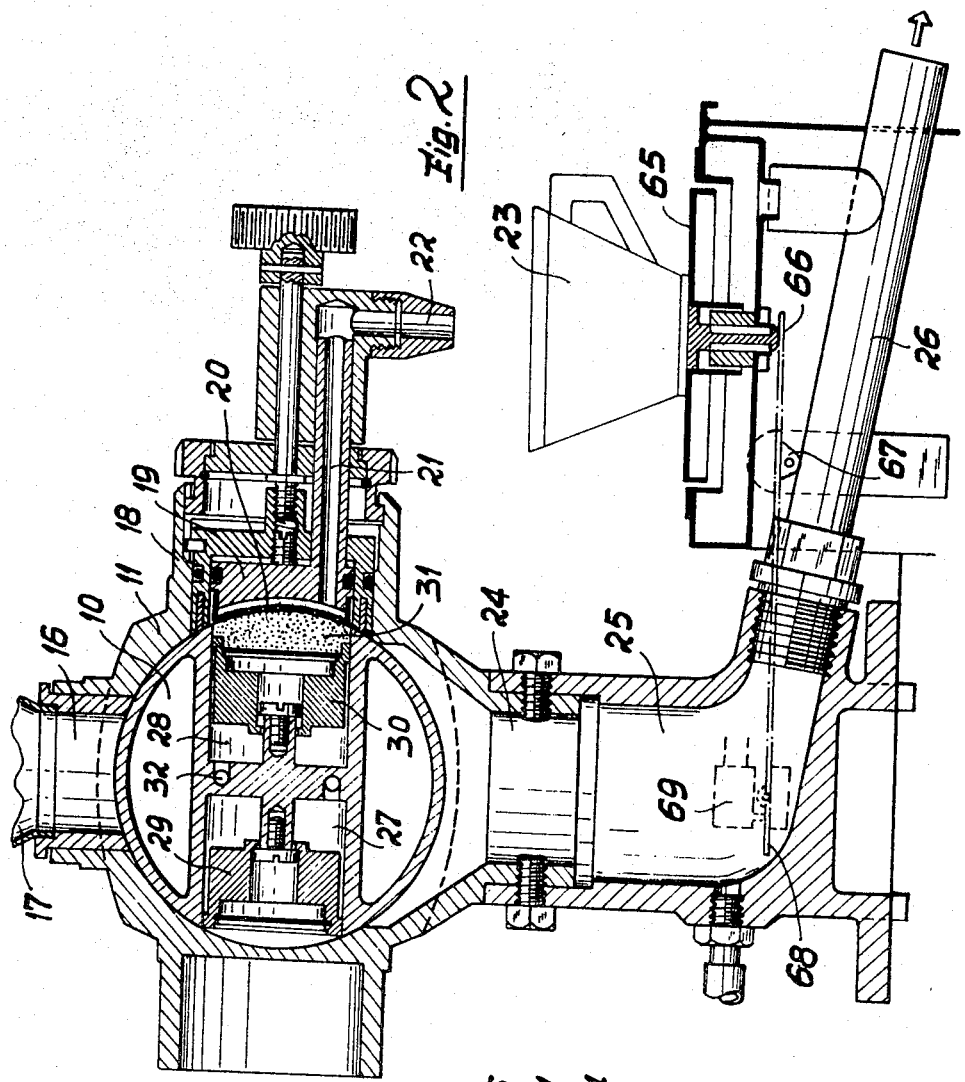
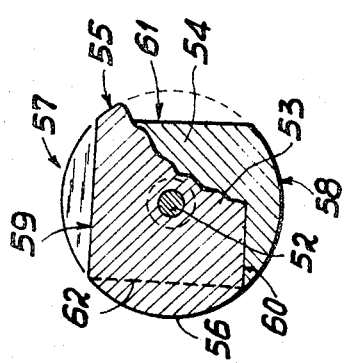

COFFEE-MAKING APPARATUS

BACKGROUND OF THE INVENTION

This invention is concerned with the art of coffeemaking devices and, more particularly, it is concerned with a new and improved coffeemaking apparatus of the automatic type and comprising a rotatable drum drivedly supported within an apparatus casing and formed with a multiplicity of coffeemaking cavities adapted for sequentially operating in a plurality of work stations.

In the past it has been customary to provide the rotatable drum with three or more coffeemaking cavities circumferentially spaced on said drum and each adapted for consecutive indexing alignment with each one of said work stations. Conventionally, such work stations comprise a first station wherein a given amount of fresh ground coffee is supplied within the cavity in alignment therewith, a second station wherein the cavity is facing a coffee screening finely perforated diaphragm and wherein pressurized hot water is caused to pass through the ground coffee in said cavity and over the diaphragm to produce the beverage, and a third station whereat the exploited coffee is delivered off the cavity and discharged to waste.

The drum is rotated step-by-step so that when any individual cavity is standing into alignment with one work station, other cavities stand individually aligned with any other work station. The drum is generally driven by an electric motor supplied by an automatically controlled circuitry including cam operated switch means, relays, time-delaying means and other devices adapted to insure the completion of the desired cycle upon triggering of an operator controlled switch. Such circuitry further controls ancillary means such as a ground coffee supply device adapted for meteredly supplying fresh coffee in the cavity indexed at the first station, a source of hot pressurized water including thermostatically controlled water heating means and water metering means for supplying a given amount of water through the coffee held within the cavity actually indexed at the second station, and other means as well known to those skilled in the art. Such various means are arranged and interrelated to ensure the desired phase relationship in the sequence of the steps included in the cycle starting with the supplying of fresh coffee at the first station and ending with exhausting of exploited coffee at the third station and setting of the machine for a new cycle of operation.

The automatic coffeemaking machines heretofore proposed are undesirably complicated and costly, and subject to several objections. One of such objections consists in the fact that, when the machine is not nearly continuously operated, that is if the time intervals between the cycles are longer than several minutes, the fresh coffee held into a cavity, waiting for percolation, and/or the exploited coffee waiting for exhaustion into a cavity, will alter, in particular in the presence of moisture and into a heated environment. The flavor of the fresh coffee is rapidly spoiled, and the exploited coffee disagreeably emanates and will stick to the cavity wall. It is evident that a perfect cleanness of the cavities and of the environment in general is essential in beverage producing machines.

It is therefore an object of this invention to provide a new and improved machine of type referred to above, which is not subject to the above and other objections.

SUMMARY OF THE INVENTION

The improved coffeemaking machine of the invention is provided with only two coffeemaking cavities positioned in opposite outfacing and coaxial relationship on the outer cylindrical wall of a cylindrical drum. Such drum is rotatably supported for stepped rotation about its substantially horizontally arranged axis within a casing having three radially directed passages defining the said first, second and third work station. The passage defining the first and the third stations are coaxial in a nearly vertical axis, diametral to said drum, the first station being the upper one. Therefore, when one of said two coffeemaking cavities is indexed at the first station, the other one will be indexed at the third station. The passage forming the second station and having a perforate diaphragm in flush with the cylindrical inner wall of the casing, frictionally contacted by the drum, is sidewardly directed and, preferably but not necessarily at right angle with the common axis of the first and third station defining passages.

The new machine operates according a two-step cycle of rotation of the drum. The first rotary motion carries one cavity, from alignment at the first station where an amount of fresh coffee has been supplied within said cavity, into alignment at the second station in facing relationship with the perforate diaphragm. Upon percolation of the beverage, the second rotary motion carries same cavity at the third station, where the exploited coffee is exhausted, whilst the other cavity is carried at the first station, ready for receiving an amount of fresh coffee. Any cavity remains at the second station only during the percolation step. The exploited coffee is anytime exhausted and disposed immediately upon percolation, and both cavities are vented to atmosphere in any interval between subsequent operations, and completely empty and clean.

Other objects, features and advantages of the invention will be made apparent as this description proceeds with reference to the accompanying drawings, forming an essential component of the disclosure, and wherein a preferred embodiment of the invention is illustrated as to its essential components, the controls, circuitry and part of the ancillary devices, appertaining to current knowledge when individually considered, being omitted.

BRIEF DESCRIPTION OF THE DRAWINGS

FIG. 1 illustrates the new machine, partly in side elevation and partly in longitudinal sectional view taken in the vertical plane of symmetry of the machine;

FIG. 2 is a cross-sectional view of the machine, taken in the plane wherein the drum rotates, said drum being shown in a position different from that of FIG. 1; and FIG. 3 illustrates fragmentarily a detail of cam means of the machine, illustrated in sectional view taken in the planes indicated at III—III in FIG. 1.

DESCRIPTION OF THE PREFERRED EMBODIMENT

Referring now to the drawings, there is shown a machine including a cylindrical drum 10 rotatably supported within a casing 11 having a cylindrical chamber formed thereinto and secured to flange side parts 12 and 13, defining the sidewalls of said chamber and having bushings for rotatably support pivots 14 and 15, integrally formed with said drum 10 and defining the axis thereof.

An upwardly open passage 16 is integrally formed in said casing 11. Said passage 16 defines the first work station and has the downturned outlet 17 of an hopper located below a conventional fresh ground coffee metering supply device (not shown) adapted for delivering given amounts of coffee into said hopper, as the first step of the cycle of operation, as conventional in the art.

A tubular hub 18 is integrally formed with and sidewardly protruding from said casing. A member 19 is adjustable fitted within said hub 18 for supporting a perforated diaphragm 20 in flush with the cylindrical wall of said chamber. Said member has a passage 21 bored thereinto and having its inlet downstream of diaphragm 20 and its outlet connected to the outlet 22 wherefrom the beverage is issued as percolated, into a collecting container such as a cup 23. The said hub 18 and more particularly said perforated diaphragm 20 define the second work station.

A downwardly turned passage 24 is formed integrally with said casing 11 coaxially with coffee inlet passage 16. Said passage 24 defines the third work station and has an elbow-shaped passage 25 connected thereto for forming a chute wherealong the exploited coffee is discharged into a dispersing duct 26. The circumferential arrangement of said passages, in clockwise direction (in the showing of FIG. 2), comprise a circumferential spacing of 90° between first and second work station, a similar spacing of 90° between second and third work station, and a circumferential spacing of 180° between third and first station.

The drum 10 has two oppositely and diametrally located cylindrical cavities 27 and 28 integrally formed thereinto. A piston shaped member 29 and respectively 30 is slidably located in each of said cavities 27, 28, for urging a layer 31 of ground coffee, during the operation of the machine, as briefly described below, against the perforated diaphragm 20 (FIG. 2) at the second work station, and then for downwardly pushing the exploited coffee into the passage 24, at the third work station.

Passage 32 are formed in the drum 10, having an outlet in one and respectively in the other of cavities 27, 28, and an outlet on the right side face of the drum (as shown in FIG. 1) so that, when any of the coffeemaking cavities 27 and 28 is indexed at the second work station, that is faces diaphragm 20, the inlet of passage 32, having its outlet in the so indexed cavity, is aligned with a passage 33 (FIG. 1) formed in an annular gasket 34 seated in the sidewall 12 and in water and pressure tight frictional contact with said right side face of drum.

Said passage 33 has its inlet 35 in the upper part of a small pressure resisting container 36, wherein a clad resistor 37 is located for heating the water filling said container. Said resistor is connected to a source of current (not shown) by a circuit (not shown) conventionally controlled by a thermostat such as 38 having its temperature-sensing element 39 located within said container.

Said container, wherein the water is heated near to 100° C. (as conventional for coffeemaking) has an inlet 40 in its bottom wall, connected by a duct 41 to a source of pressurized water, such as a pump 42 driven by a motor (not shown) which is activated when a cavity 27 or 28 is standing at the second work station. The inlet 43 of pump 42 is connected to one outlet 44 of a conventionally constructed and electrically operated three-way valve 45 having its second outlet 46 connected to a metering reservoir 47 and its inlet 48 connected to a source 49 of water, such as the regular water supply network.

Preferably, the metering reservoir 47 is of the type comprising a plurality of contacts M1—M4 individually defining different levels L1—L4, said contacts being connected to the valve actuating circuit by means of a selector, whereby said valve can be operated to prepare, before each cycle of operation of the machine, a selected amount of water, and then the reservoir 47 can be connected, via the outlets 44 and 46 of valve 45, the pump 42 and duct 41, to the container, whereby, upon actuation of the pump, during standstill of one cavity 27 or 28 in the second work station (facing diaphragm 20) a metered selected amount of water is caused to be forced in the container 36 and a corresponding amount of hot pressurized water is forced through the layer 31 (FIG. 2) of coffee for percolation of the beverage therethrough and from outlet 22 in the cup 23.

A motor 50 is provided for step-by-step driving the drum 10. The shaft of said motor is conventionally keyed to a reduction gear 51 drivingly connected to the shaft 15 integral with the drum and to a hub 52 having two cam members 53 and 54 secured thereto. Such cam means 53 and 54 have similar camming outer surfaces, but phased at 90° from each other. As shown in FIG. 3, cam 53 has arc-shaped portions 55 and 56 and cam 54 has arc-shaped portions 57 and 58, said portions of said cams being alternatively arranged with chord-shaped portions 59, 60 and respectively 61, 62.

Said camming surfaces engage conventional cam followers actuating switches 63 and respectively 64 connected in the motor 50, pump 42 and valve 45 controlling circuits to provide the proper sequence of operation, as known in the art of automatic coffeemaking apparatuses of the type considered.

The cycle of operation can be triggered by means of any operator controlled means such as a pushbutton switch. Preferably and as shown in phantom lines in FIG. 2, the trigger means consists of a switch 69 actuated by a ballasted end portion 68 of a lever pivotally supported at 67 and the opposite end portion of which bears a plate or tray 65 positioned to support the cup 23 beneath the beverage outlet 22, whereby the machine is started by simply placing an empty cup 23 in its proper beverage receiving position, the cycle of operation following under control of the various well known control means forming no part of this invention. Such cycle could also be triggered by a coin-operated device, if desired.

From what above and by a consideration of the accompanying drawings it will be evident that the new machine is a great deal simpler than the prior art construction. Its drum is simple and easily operatable. FIG. 1 shows the drum in its "rest" position, waiting for operation at command. Both its cavities 27 and 28 are fully vented to atmosphere and are empty. The cycle has its end when the drum has been rotated by 180° and, upon exhaustion of the exploited coffee, by the pressure remaining in the cavity through which the beverage has been percolated in the position shown in FIG. 2, the above condition of "rest" are resumed. The machine comprises very few components, in particular movable parts, of sturdy construction.

Although we have disclosed the now preferred embodiment of our invention, it will be apparent to those skilled in art that various modifications and ramifications may be made with respect thereto without departing from the spirit and scope thereof as defined in the appended claims.

We claim:

1. In an automatic coffeemaking apparatus, a combination comprising a stationary casing have an inner cylindrical surface defining a cylindrical chamber having a fresh coffee inlet means at a first station, a screened beverage outlet at a second station circumferentially displaced in one direction from said first station, and a used coffee discharge outlet means at a third station further circumferentially displaced in said direction and located diametrically opposite said first station; a cylindrical drum having an outer surface sealingly engaging said inner cylindrical surface of said casing and having only two diametrically opposite coffeemaking cavities extending radially inwardly from said outer surface, said drum being stepwise rotatable about the axis of the chamber for consecutive indexing alignment of said cavities with said stations; and drive means operatively connected to said drum for rotating the same, when actuated, through a cycle of operation in which the cavity located at the first station is indexed first into alignment with said second station and then into alignment with said third station so that at the end of said cycle the other cavity will be aligned with said first station.

2. The combination of claim 1, wherein the said drum is supported for rotation about a horizontal axis.

3. The combination of claim 1, wherein said second work station defining said screened outlet is circumferentially spaced of 90° from both said inlet and outlet means at said first and respectively third work stations to provide step-by-step motion of uniform amplitude for said drum and alternate servicing of either coffeemaking cavities at said second work station.

4. The combination of claim 1, comprising passage means in said drum and in said casing for selectively connecting either of said coffeemaking cavities when at said second work station to a source of metered amounts of hot pressurized water for forcing a metered amount of such water through an amount of coffee held in said cavity at said second station in faced relationship with said screened outlet.

5. The combination of claim 4, wherein said source of water comprises a pressure resisting thermostatically heated container, having its upper portion connected to said passage means, and a pump having its outlet connected to the lower portion of said container and its inlet connected to a source of water via a water amount metering means.

6. The combination of claim 5, including a three-ways valve having its inlet connected to said source of water, a first outlet connected to a metering reservoir and a second outlet connected to the inlet of said pump, said valve being operatable between a position in which its inlet is connected to said first outlet to prepare a metered amount of water in said reservoir, another position in which said first outlet is connected to said second outlet whereby upon actuation of said pump a metered amount of pressurized water is forced in the lower portion of said thermostatically heated container and a corresponding amount of hot pressurized water is forced off from the upper portion of same container and in the said passage means and coffeemaking cavity standing at said second work station.

7. The combination of claim 1, comprising a downwardly turned beverage outlet, a beverage receiving cup vertically movable support tray located beneath said outlet, biased support means upwardly urging said tray when not loaded with said cup, and automatic operation triggering means sensing the motion of said tray upon loading it with said cup.

8. The combination of claim 1, and including a piston axially slidable in each cavity, said passage means communicating with the respective cavity axially rearwardly of the piston therein.